US009357346B2

(12) United States Patent
Jagannath (10) Patent No.: US 9,357,346 B2
(45) Date of Patent: May 31, 2016

(54) SYSTEM AND METHOD FOR INDOOR LOCATION MAPPING AND TRACKING (71) Applicant: Aisle411, Inc., St. Louis, MO (US)

(72) Inventor: Ramanujam Jagannath, San Jose, CA (US)

(73) Assignee: aisle411, Inc., St. Louis, MO (US)

( * ) Notice: Subject to any disclaimer, the term of this patent is extended or adjusted under 35 U.S.C. 154(b) by 386 days.

(21) Appl. No.: 13/943,646

(22) Filed: Jul. 16, 2013

(65) Prior Publication Data
US 2014/0018096 A1   Jan. 16, 2014

Related U.S. Application Data (60) Provisional application No. 61/672,216, filed on Jul. 16, 2012, provisional application No. 61/672,206, filed on Jul. 16, 2012.

(51) Int. Cl.
*H04W 4/04* (2009.01)
*H04W 4/02* (2009.01)

(52) U.S. Cl.
CPC .............. *H04W 4/021* (2013.01); *H04W 4/043* (2013.01); *H04W 4/023* (2013.01)

(58) Field of Classification Search
CPC ...... H04W 4/021; H04W 4/043; H04W 4/023
See application file for complete search history.

(56) References Cited

U.S. PATENT DOCUMENTS

2004/0203904 A1* 10/2004 Gwon ................... G01S 5/0252
455/456.1
2015/0256980 A1* 9/2015 Ogale .................... H04W 64/00
370/328

* cited by examiner

*Primary Examiner* — Dang Ton
*Assistant Examiner* — Mandish Randhawa
(74) *Attorney, Agent, or Firm* — Lewis Rice LLC (57) ABSTRACT Implementations of the present disclosure involve a system and/or method for indoor mapping. The indoor mapping system may receive wireless signals from wireless devices located in an area and create a wireless signal fingerprint that identifies each signal and the strength of the signal. A user may identify the location that the wireless signal fingerprint was taken on a geo-referenced map. After the wireless signal fingerprints for an area have been mapped, a user may determine a location by taking a wireless signal fingerprint and comparing the wireless signal fingerprint to previously taken wireless signal fingerprints.

3 Claims, 7 Drawing Sheets

SYSTEM AND METHOD FOR INDOOR LOCATION MAPPING AND TRACKING

RELATED APPLICATIONS

This application claims priority under 35 U.S.C. §119(e) to provisional patent application No. 61/672,216 titled "Method for Capturing Positional Data Indoors," filed on Jul. 16, 2012 and provisional patent application No. 61/672,206 titled "Providing accurate location information to mobile users," filed on Jul. 16, 2012 which are both hereby incorporated by reference herein.

FIELD OF THE DISCLOSURE

Aspects of the present disclosure involve using wireless communication signal characteristics to map a location and to determine a location on a map.

BACKGROUND

The global positioning system (GPS) is a satellite-based system for determining a location. The GPS satellites orbit the earth and regularly transmit messages that include the time that the message was transmitted and the position of the satellite at the time of the message transmission. A GPS receiver receives the transmission and calculates the distance to the sending satellite using the time it took the message to reach the receiver and the speed of light. Using the distance and position information from at least four GPS satellites allows for the receiver to calculate its position.

Wireless connectivity technologies have proliferated throughout buildings. Wireless technologies include WiFi, Bluetooth, cellular signals and other technologies. Many businesses have deployed WiFi networks in buildings to provide employees, customers, or other users with access to a company intranet or to the Internet.

Each type of network has a number of identifiers for identifying various pieces of equipment and the network itself. For example, each WiFi network generally has a service set identifier (SSID) that broadcasts a network name. Each piece of networking equipment, including routers and switches, and each computing device that connects to the network, such as personal computers, tablet computers, and smartphones, has a unique media control access (MAC) address that identifies the hardware and is used for routing.

Mobile devices, such as smart phones and tablet computers, have increasingly incorporated GPS technologies to provide users with location-based services. One problem with GPS technology is that a GPS receiver's location can only be calculated when the receiver receives signals from four or more GPS satellites. Thus, GPS receivers are of little to no use when the GPS receiver is located indoors.

It is with these issues and problems in mind that various aspects of the present disclosure were developed.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

Aspects of the present disclosure involve an indoor mapping system that utilizes wireless communications fingerprints to map an area. An indoor map includes a schematic that has been synchronized to global map data. Each location on the indoor map may therefore be associated with the actual latitude and longitude of the location. Once an area has been mapped, wireless communications fingerprints may be used to determine the location of a device by comparing a current fingerprint to the previously mapped fingerprints. A wireless communications fingerprint may include a listing of any device that is broadcasting a wireless signal and the strength of the wireless signal.

Figure 1:
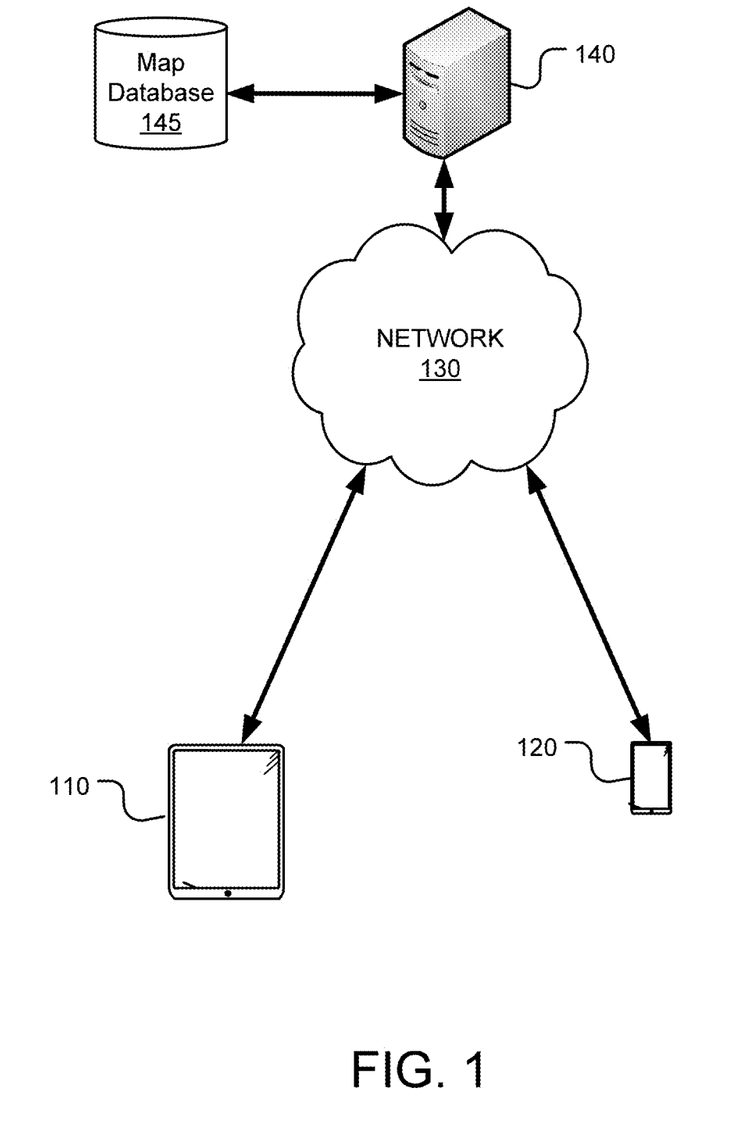
FIG. 1 depicts a block diagram of a computing environment of the system.

Referring to FIG. 1, an example computing environment for an indoor mapping system is depicted. User devices 110, 120 may include any type of mobile wirelessly connected user device such as a mobile phone, smart phone, tablet computer, or laptop computer. The user devices may also include various antennas and receivers/transmitters adapted for specific types of wireless communications. For example, the user devices 110, 120 may be adapted to communicate using WiFi standards, specifically including 802.11 communications standards. The user devices 110, 120 may also be adapted to communicate using Bluetooth and according to cellular standards.

The user devices 110, 120 may connect to a server 140 using a network 130, such as the Internet. The server 140 may be configured to store and maintain map information. For example, conventional map data and indoor mapping data may be stored in a database 145 operated by the server 140. The server 140 may include any computing device capable of storing and maintaining map information and sending and receiving map information using the network 130. In some examples, the server 140 may connect to an external map database operated by a third party in addition to storing indoor mapping data locally. The server 140 may, for example, connect to Google Maps®, Google Earth®, or any other mapping service to obtain any map information stored in those services, and to geo-reference indoor maps.

Figure 2:
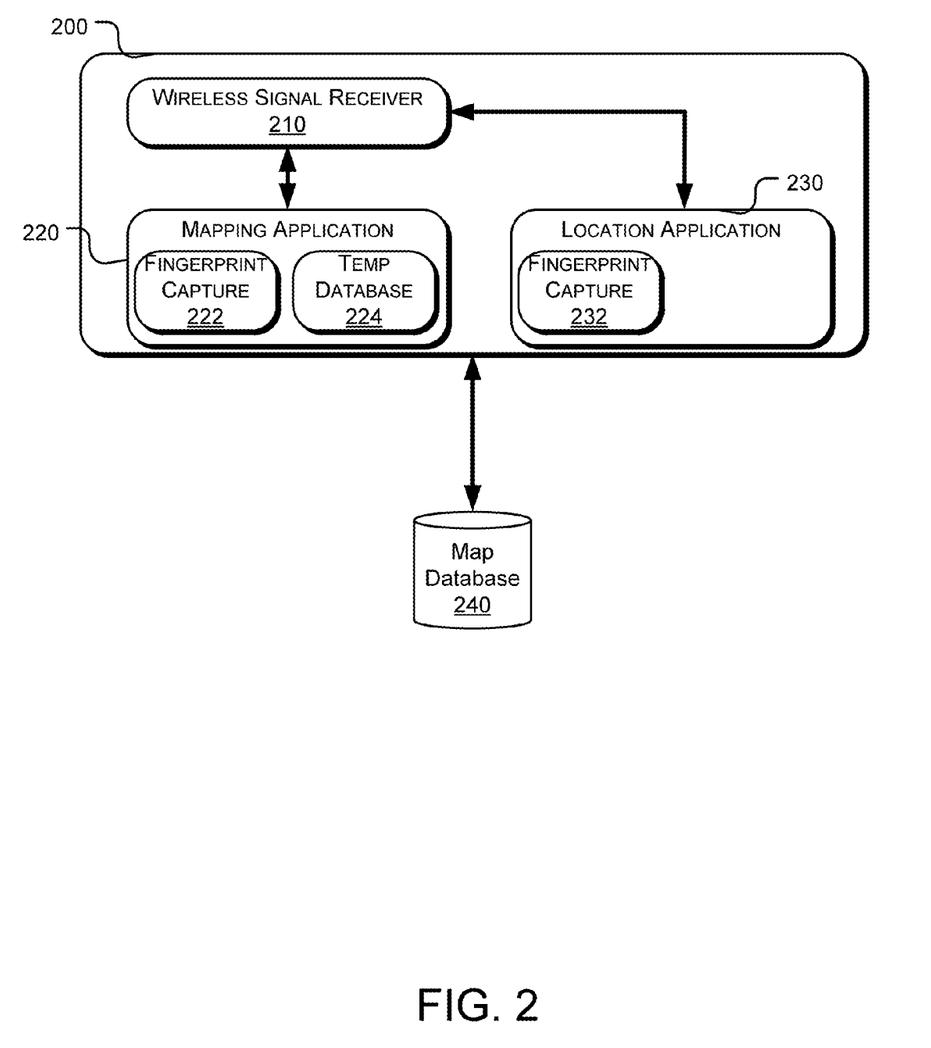
FIG. 2 depicts a method of creating an indoor map and using the indoor map using the indoor mapping system.

Referring now to FIG. 2, a system for mapping and using an indoor map is depicted. The system includes a user device 200 similar to user devices 110,120 described above. The user device has a wireless signal receiver 210 that is configured to sense various wireless signals for use in determining a location fingerprint. A location fingerprint may correspond to, for example, a wireless signal identifier and signal strength.

According to one aspect, the wireless signal receiver 210 may be a 802.11 based WiFi wireless networking card. Operating on the user device 200 is a mapping application 220, a location determining application 230, or both. Both the mapping application 220 and the location determining application 230 are configured to interface with the wireless signal receiver 210 and each application has a wireless fingerprint generator 222, 232. The wireless fingerprint generator is configured to use the wireless signal receiver 210 to measure the strength of wireless signals that are present.

In the field of telecommunications, a received signal strength indicator (RSSI) is a measurement of the strength of a wireless signal. The wireless fingerprint generator 222, 232 may utilize the wireless signal receiver to take RSSI measurements for each available wireless source. The wireless fingerprint generator 222, 232 maps each RSSI measurement to an indicator for the source. The indicator for the source may include any information for identifying the source of the wireless signal. For example, in some instances, a service set identification (SSID) and/or a media control access (MAC) address may be used to identify each wireless source. The mapping application 220 also includes a temporary database 224 for temporarily storing a set of fingerprints for a location until the set is uploaded to a map database 240.

The map database 240 includes all mapping related data. The user device 200 may communicate with the map database 240 to send and receive map data using any networking or communications medium. For example, the user device 200 may connect to a network to access the map database 240. The mapping application 220 is configured to update the map database 240 with new fingerprints for a location. The location determining application 230 is configured to determine a location based on fingerprint and map information stored in the map database 240.

Figure 3:
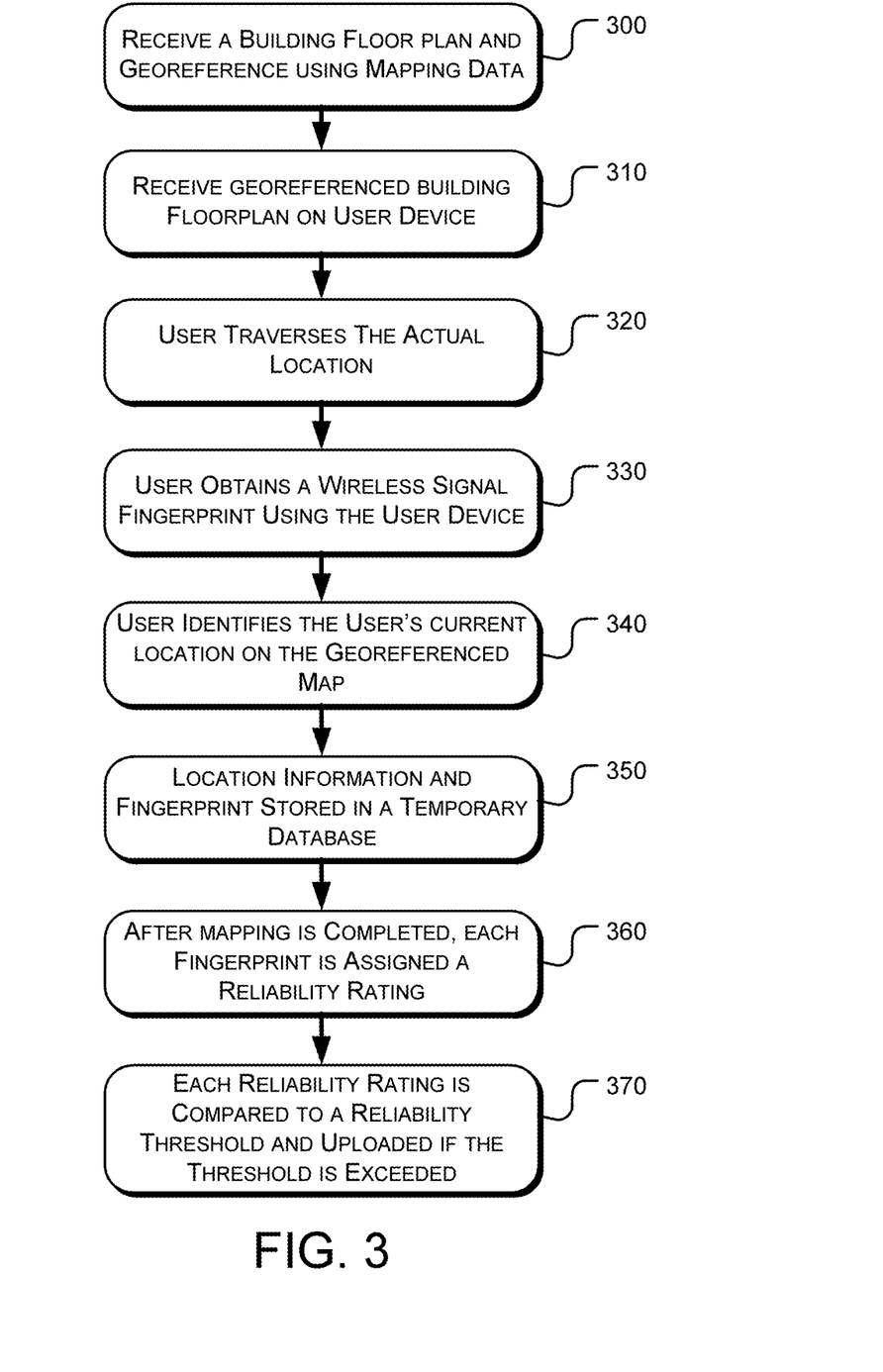
FIG. 3 depicts a method of creating an indoor map using wireless signal fingerprints and a geo-referenced building map.

Referring now to FIG. 3, a method of mapping an indoor location is depicted. A building schematic or floor plan is provided to the system for mapping. The floor plan may be geo-referenced to the actual location of the building on a map (operation 300). For example, the building floor plan may be placed on an image from Google Earth® or similar mapping application. Thus, when viewing a map, a user may be pan and zoom to a building location, and once the map is zoomed to the location, the building floor plan may be displayed.

A user may receive the geo-referenced building floor plan on the user's device 200 for use with the mapping application 220 (operation 310). The user may download the building floor plan to the device, or the floor plan may be automatically downloaded when the user arrives at the location of the building. Once the user is present at the location with the user device 200, the user travels around the indoor location (operation 320). As the user is traveling around the indoor location, the user may periodically stop to obtain a wireless signal fingerprint using the user device 200 (operation 330). The taking of a wireless signal fingerprint may be initiated by the user or by an indication by the mapping application 220. For example, the user may stop and select for the mapping application 220 to take a wireless signal fingerprint. In another example, the mapping application may notify the user that a wireless signal fingerprint should be taken if the user has traveled a certain distance or if a time period has elapsed. After a wireless signal fingerprint has been taken, the user identifies on the building floor plan the location of where the wireless signal fingerprint was taken (operation 340).

Figure 4:
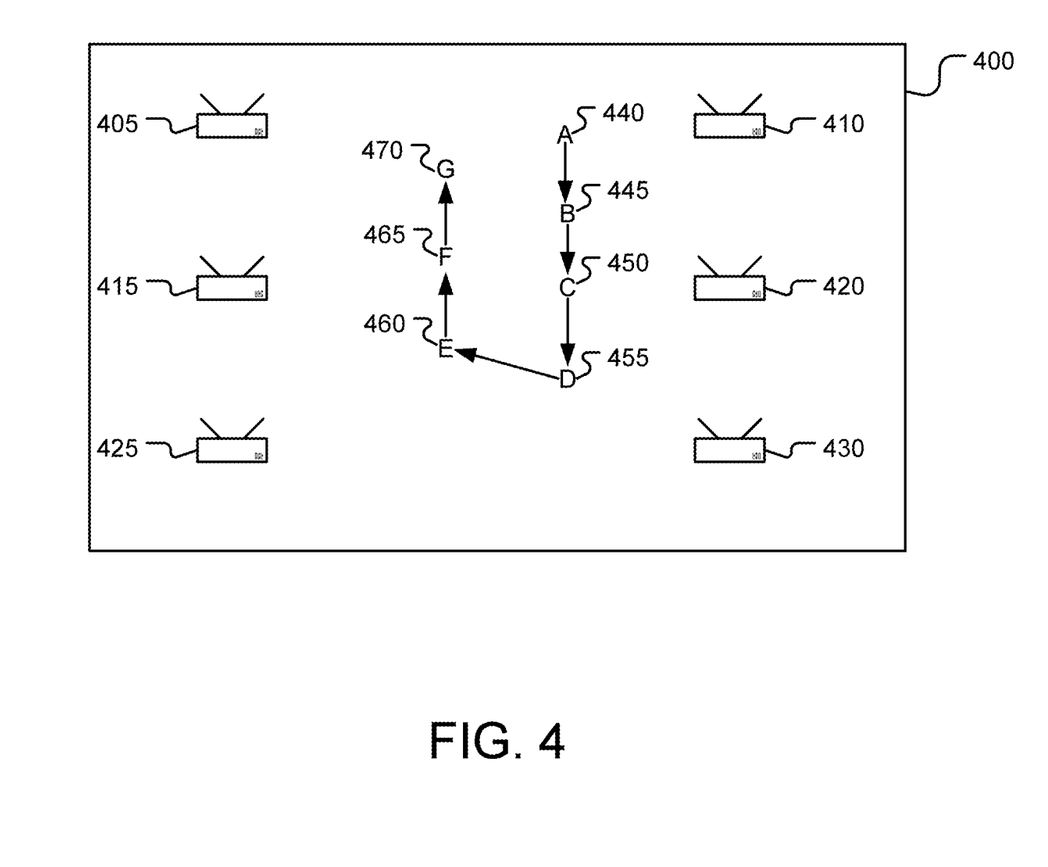
FIG. 4 depicts a building schematic including WiFi access points and the traversal of the building by a user taking wireless signal fingerprints.

Referring to FIG. 4, an example of a user traversing an indoor location is depicted. A geo-referenced building floor plan 400 has been provided to the user and is displayed on the user device 200. The building includes six WiFi access points 405-430. Each of the access points has a unique MAC address and emits a WiFi signal. The user may take a wireless device and travel around the indoor location stopping at points A-G (440-470). In this example, a wireless signal fingerprint is taken at each point A-G (440-470) and each wireless signal fingerprint includes the MAC address of each of the six WiFi access points 405-430 that are detectable at a point and the RSSI of each wireless signal. For example, at location A (440), wireless access points 1, 2, 3, and 4 (405-420) may be detectable. Thus, the wireless signal fingerprint includes the MAC addresses of wireless access points 1-4 (405-420) as well as the RSSI of each of the wireless access points.

Returning to FIG. 3, each of the wireless signal fingerprints is then stored locally in a temporary database 224 on the user device 200 (operation 350). After the user has finished collecting wireless signal fingerprints, the fingerprints may each be assigned a reliability rating (operation 360). Each of the reliability ratings may be compared to a threshold and wireless signal fingerprints that exceed the threshold may be uploaded to map database 240, while wireless signal fingerprints that do no exceed the threshold may be discarded (operation 370).

Figure 5:
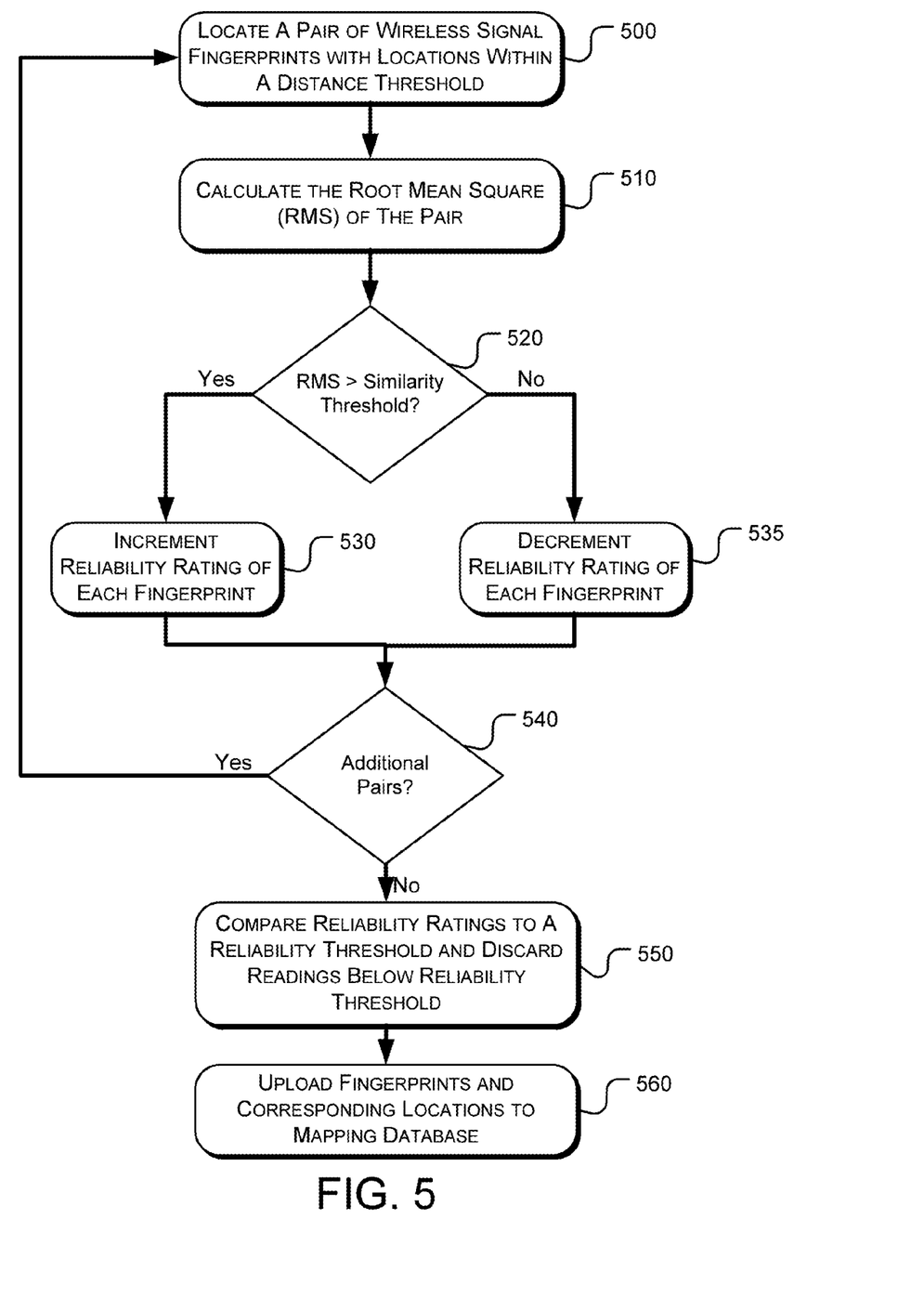
FIG. 5 depicts a method of determining the reliability of a wireless signal fingerprint by comparing any locations that are relatively close to each other.

Referring now to FIG. 5, a method of assigning a reliability rating to a wireless signal fingerprint is depicted. The reliability rating may be used to ensure that the correct location was selected for each of the wireless signal fingerprints. As described above, each of the wireless signal fingerprints may be temporarily stored in a database located on the user device 200. After the user has completed the mapping process the user may elect to upload the wireless signal fingerprints. Before uploading the results, a reliability rating is assigned to each wireless signal fingerprints. The reliability readings of each wireless signal fingerprint are initialized to zero. The reliability rating is assigned by locating readings that were taken within a threshold distance from each other (operation 500). The threshold distance may be selected according to any factor. For example, a default threshold of 10 meters may be selected, but in some instances a larger or smaller threshold may be chosen. When a pair of wireless signal fingerprints were taken within the threshold distance of each other, the root mean square of the two readings may be calculated (operation 510). The root mean square is then compared to a similarity threshold (operation 520). If the two fingerprints are too similar (e.g. below the similarity threshold), then it is implied that the locations that where associated with the wireless signal fingerprints were incorrect and the reliability rating for each of the wireless signal fingerprints is decremented by one (operation 535). If the two fingerprints are sufficiently dissimilar (e.g. above the similarity threshold), then the reliability rating of each of the fingerprints is incremented by one (operation 530). The system then identifies any other additional pairs of wireless signal fingerprints that are within the threshold distance (operation 540) and repeats the root mean square comparison. Once all of the reliability ratings have been assigned, each rating is compared to a reliability threshold and any wireless signal fingerprints with a reliability rating beneath the reliability threshold is discarded (operation 550). Wireless signal fingerprints with reliability ratings above the threshold are then uploaded to the mapping database 240 (operation 560).

By utilizing the reliability rating, the system may be used in a crowdsourcing environment and reliable data may be maintained. For example, if mapping were completed by crowdsourcing, then a person taking wireless signal fingerprints would be required to accurately show the location where each wireless signal fingerprint was taken.

Figure 6:
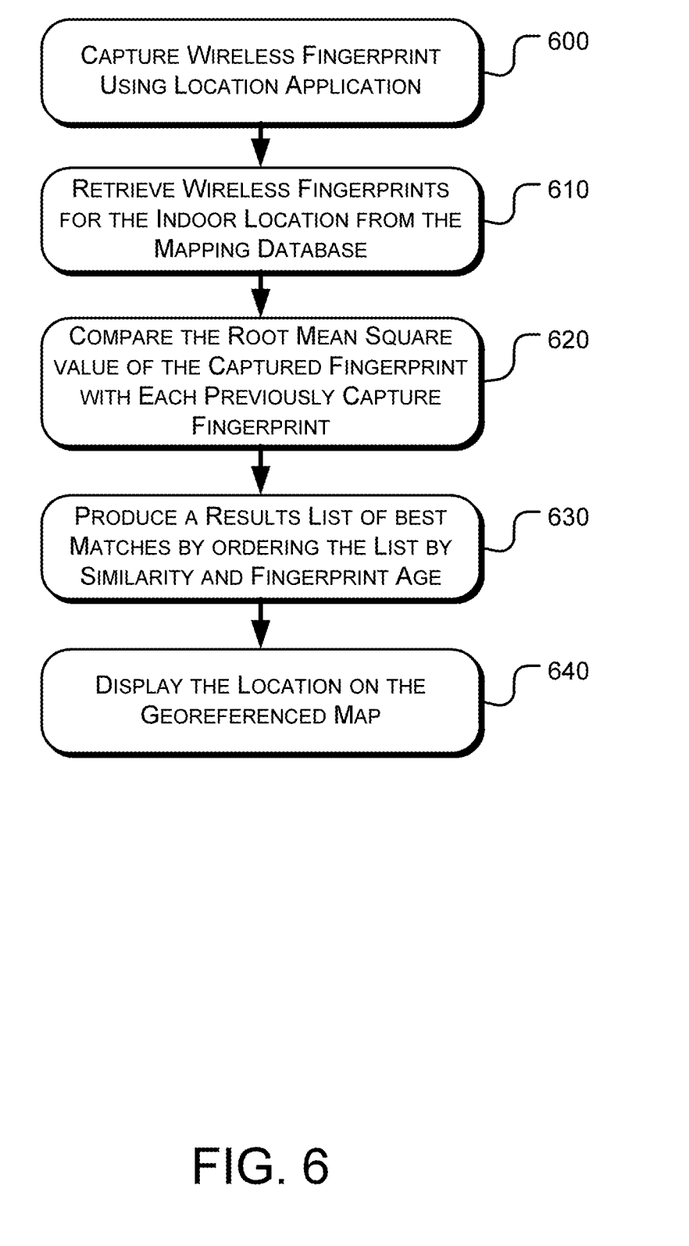
FIG. 6 depicts a method of determining a location and displaying the location based on a wireless signal fingerprint.

Referring now to FIG. 6 and with continued reference to FIG. 2, a method of determining an indoor location that was mapped using the mapping application 230 is depicted. A user at the geo-referenced indoor location may activate the location determining application 230 on the user device 200. The location determining application 200 displays a map of the geo-referenced indoor location and an indicator of the user's location. The location determining application 230 regularly captures a wireless signal fingerprint (operation 600). The location determining application retrieves the wireless signal fingerprints from the map database 240 (operation 610). The newly captured wireless signal fingerprint is then compared to the previously captured wireless signal fingerprints and the most similar fingerprint is identified (operation 620). The similarity of wireless signal fingerprints may be determined by computing the root mean square of the newly captured wireless signal fingerprint and each of the previously captured wireless signal fingerprints. A results list is generated that weights the previously captured wireless signal fingerprints according to the calculated root mean square values and the age of the wireless signal fingerprint (operation 630). The highest weighted wireless signal fingerprint is the determined location of the user and the location is indicated on the indoor map shown on the user device 200 (operation 640).

Figure 7:
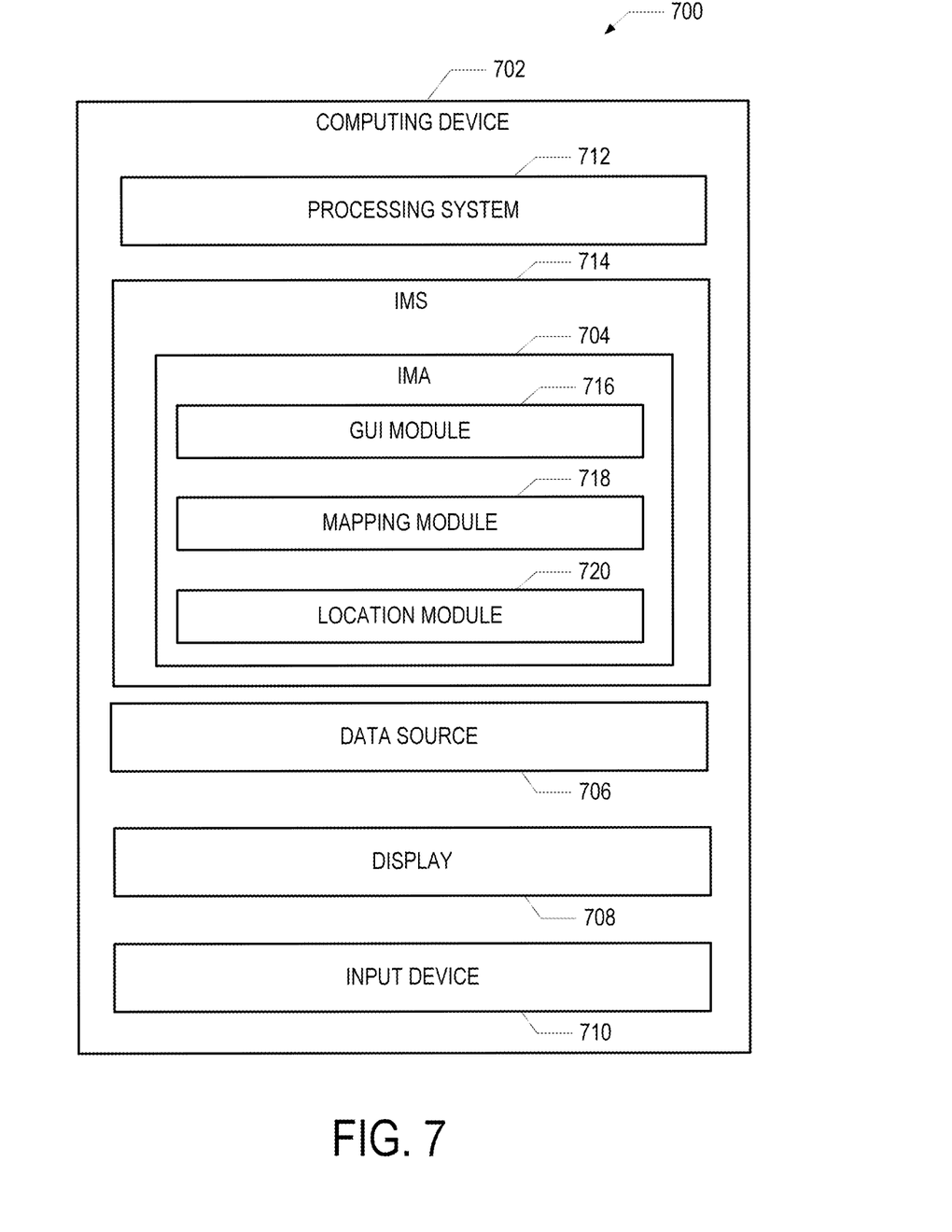
FIG. 7 depicts a general purpose computer capable of being used in accordance with the present disclosure.

FIG. 7 depicts an exemplary Indoor Mapping System (IMS) 700 in accordance with aspects of the invention. The IMS 700 includes a computing device 702 or other computing device or system that includes an indoor mapping application (IMA) 704. The IMS 700 also includes a data source 706 that stores mapping information including geo-referenced maps as well as fingerprint and location information for indoor maps. Although the data source is illustrated as being located on the computing device 702, it is contemplated that the data source 706 may be a database that is located on another computing device or computing system that is connected to the computing device 702.

The computing device 702 can be a server, a laptop computer, a personal digital assistant, a tablet computer, a smart phone, standard personal computer, or another processing device or combination of devices. The computing device 702 includes a display 708, such as a touchscreen display, for displaying data and/or graphical user interfaces. The computing device 672 may also include an input device 710, such as a keyboard or a pointing device (e.g., a mouse, trackball, pen, or touch screen) to interact with various data entry forms to submit image slice selection data and/or surface fault point input data.

According to one aspect, a system interface, such as the one discussed above may have multiple entry forms that are responsive to user input. For example, the user of the computing device 702 can interact with system interface to view a map, map a location and view the user's location on a map, by using the touchscreen to navigate the system interface. It is also contemplated that the user may submit map related data by interacting with one or more displayed fields (not shown) to enter data related to events or other aspects of the system. After entering information and/or a request the request is provided to the IMA 704 for processing.

Although the IMS 700 is depicted as being implemented on a single computing device, it is contemplated that in other aspects the IMA 704 may be executed by a server computing device (not shown) that receives a user's selection requests and/or other input data from a remote client computer (not shown) via a communication network, such as the Internet.

According to one aspect, the computing device 702 includes a processing system 712 that includes one or more processors or other processing devices. The computing device 702 also includes a computer readable medium ("CRM") 714 configured with the IMA 704. The IMA 704 includes instructions or modules that are executable by the processing system 712 to perform indoor mapping.

The CRM 714 may include volatile media, nonvolatile media, removable media, non-removable media, and/or another available medium that can be accessed by the computing device 700. By way of example and not limitation, the CRM 714 comprises computer storage media and communication media. Computer storage media includes nontransient memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

A GUI module 716 displays a data and graphics received from, for example, the data source 706 in response to a retrieval request. The retrieval request is generated, for example, by a user of the computing device 702 interacting with indoor mapping as described in connection with operations 210-270 of FIG. 2.

As described above, the event management system 100 displays various types of user information, as well as advertisements. The GUI modules 616 displays a requested type of information, such as described above in connection with operations 300-370 of FIG. 3 or operations 600-640 of FIG. 6.

A mapping module 718 is used for mapping an indoor location according to request from a user. The indoor mapping corresponds to requests made to the various systems such as those described above in connection with FIG. 3. According to one aspect, the mapping module 618 retrieves wireless signal fingerprints, stores the fingerprints temporarily, assigns the fingerprints a reliability rating, and uploads the fingerprints to a database, such as described in connection with FIGS. 3, 4, and 5.

A location module 720 is used for deterring an indoor location according to request from a user. The indoor location determination corresponds to requests made to the various systems such as those described above in connection with FIG. 6.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The invention claimed is:

1. A system for indoor mapping comprising:
   at least one processor;
   an application executed by the at least one processor to:
      receive a geo-referenced map;
      receive a first wireless signal fingerprint identifying a first set of present wireless signals and corresponding signal strengths for each wireless signal;
      receive a first user input identifying a first location on the geo-referenced map where the first wireless signal fingerprint was taken;
      upload the first location and the first wireless signal fingerprint to a mapping database;
      receive a second wireless signal fingerprint identifying a second set of present wireless signals and corresponding signal strengths for each wireless signal;
      receive a second user input identifying a second location on the geo-referenced map where the second wireless signal fingerprint was taken;
      upload the second location and the second wireless signal fingerprint to a mapping database;
      assign a reliability rating to each wireless signal fingerprint, wherein the reliability rating is incremented when:
         the first location and the second location are within a threshold distance from each other; and
         a root mean square of the first wireless signal fingerprint and the second wireless signal fingerprint is greater than a similarity threshold.

2. The system of claim 1, wherein the application further causes the processor to assign a reliability rating to each wireless signal fingerprint, wherein the reliability rating is decremented when:
   the first location and the second location are within a threshold distance from each other; and
   a root mean square of the first wireless signal fingerprint and the second wireless signal fingerprint is less than a similarity threshold.

3. The system of claim 2, wherein the first wireless signal fingerprint and first location and the second wireless signal fingerprint and second location are uploaded when the reliability rating exceeds a reliability threshold.

* * * * *